(12) United States Patent
Yu

(10) Patent No.: US 8,091,128 B2
(45) Date of Patent: Jan. 3, 2012

(54) INFORMATION FLOW ENFORCEMENT FOR RISC-STYLE ASSEMBLY CODE IN THE PRESENCE OF TIMING-RELATED COVERT CHANNELS AND MULTI-THREADING

(75) Inventor: Dachuan Yu, Santa Clara, CA (US)

(73) Assignee: NTT Docomo, Inc., Tokyo (JP)

( * ) Notice: Subject to any disclaimer, the term of this patent is extended or adjusted under 35 U.S.C. 154(b) by 924 days.

(21) Appl. No.: 11/840,158

(22) Filed: Aug. 16, 2007

(65) Prior Publication Data
US 2008/0072323 A1 Mar. 20, 2008

Related U.S. Application Data

(60) Provisional application No. 60/844,974, filed on Sep. 14, 2006.

(51) Int. Cl.
*G06F 11/00* (2006.01)
(52) U.S. Cl. .............................................. 726/22; 726/1
(58) Field of Classification Search .................. 726/1, 22
See application file for complete search history.

(56) References Cited

U.S. PATENT DOCUMENTS 5,915,085 A * 6/1999 Koved ............................... 726/1
6,253,370 B1 * 6/2001 Abadi et al. .................. 717/154

FOREIGN PATENT DOCUMENTS
WO WO 2006/069335 A 6/2006

OTHER PUBLICATIONS

PCT International Search Report, PCT US 2007/020067, mailed Dec. 12, 2007 (4 pages).
PCT Written Opinion of the International Searching Authority, PCT US 2007/020067, mailed Dec. 12, 2007 (5 pages).
D.Yu, "More typed assembly languages for confidentiality," DoCoMo USA Labs Technical Report (online), retrieved from the Internet on Nov. 28, 2007: http://www.docomolabsresearchers-usa.com/{dyu/talcp-tr.pdf>.
D. Yu, "Publications at http://cs-www.cs.yale.edu/homes/dachuan/pubs.html" (online), retrieved from the Internet on Nov. 27, 2007.
D.Yu, "Toward more typed Assembly Languages for Confidentialisty" PCC 2006: International Workshop on Proof Carrying Code (online), Aug. 11, 2006, XP002460518, Seattle, Washington, USA. Retrieved from the Internet on Nov. 29, 2007: http://www.easychair.org/FLoC-06/PCC-preproceedings.pdf#page=8>.
Sablefeld et al., "Language-Based Information-Flow Security," IEEE Journal on Selected Areas in Communications, IEEE Service Center, Piscataway, U.S., vol. 21, No. 1, Jan. 2003, pp. 1-15, XP011065575, ISSN: 0733-8716.

(Continued)

*Primary Examiner* — Jacob Lipman
(74) *Attorney, Agent, or Firm* — Blakely, Sokoloff, Taylor & Zafman LLP

(57) ABSTRACT

A method and apparatus is disclosed for performing information flow enforcement for assembly code. In one embodiment, the method comprises receiving assembly code having timing annotations with type information that enforce information flow with respect to one or more of timing-related covert and concurrent channels when statically checked as to whether the code is in violation of a security policy and performing verification with respect to information flow for the assembly code based on a security policy.

32 Claims, 13 Drawing Sheets

OTHER PUBLICATIONS

D.Yu, "Toward more typed Assembly Languages for Confidentialisty" PCC 2006: International Workshop on Proof Carrying Code (online), Aug. 11, 2006, XP002460518, Seattle, Washington, USA. Retrieved from the Internet on Nov. 29, 2007: http://www.easychair.org/FLoC-06/PCC-day222.html#16105>.

J. Agat, Transforming Out Timing Leaks, In Proc. 27th ACM Symposium on Principles of Programming Languages, 15 Pages, Boston, MA, Jan. 19-21, 2000.

R. Medel A. Compagnoni, and E. Bonelli, Non-Interference for a Typed Assembly Language, In Proc. 2005 Workshop on Foundations of Computer Security, 12 Pages, Chicago, IL, May 13, 2005.

R. Medel A. Compagnoni, and E. Bonelli, A Typed Assembly Language for Non-Interference, In Proc. 9th Italian Conference on Theoretical Computer Science, 15 Pages, Siena, Italy, Oct. 2005.

G. Morrisett, D. Walker, K. Crary, and N. Glew, From System F to Typed Assembly Language, ACM Transactions on Programming Languages and Systems, 13 Pages, 21(3): 527-568, Nov. 1999.

A. Sabelfeld, A.C. Myers, Language-Based Information-Flow Security, IEEE Journal on Selected Areas in Communications, 15 Pages, 21(1):5-19, Jan. 23, 2003.

A. Sabelfeld, D. Sands, Probabilistic Noninterference for Multi-threaded Programs, In Proc. IEEE Computer Security Foundations Workshop, 16 Pages, Cambridge, England, Jul. 2000.

G. Smith, D. Volpano, Secure Information Flow in a Multi-threaded Imperative Language, In Proc.25th ACM Symposium on Principles of Programming Languages, 10 Pages, San Diego, CA, Jan. 1998.

D. Volpano and G. Smith, Eliminating Covert Flows with Minimum Typings, 10th IEEE Computer Security Foundations Workshop, 14 Pages, Washington, DC, Jun. 1997.

D. Volpano, and G. Smith, A Type-Based Approach to Program Security, 7th International Joint Conference on Theory and Practice of Software Development, vol. 1214 of LNCS, 15 Pages, Lille, France, Apr. 1997.

D. Volpano and G. Smith, Probabilistic Noninterference in a Concurrent Language, 11th IEEE Computer Security Foundations Workshop, 22 Pages, Washington, DC Jun. 1998.

D. Yu and N. Islam, A Typed Assembly Language for Confidentiality, Technical Report DCL-tr-2005-002, DoCoMo Communications Laboratories USA, 14 Pages, San Jose, Ca, Mar. 2005, Http://docomolabsresearchers-usa.

D. Yu and N. Islam, A Typed Assembly Language for Confidentiality, 15th European Symposium on Programming, vol. 3924 of LNCS, 18 Pages, Vienna, Austria, Mar. 2006.

Korean Office Action for corresponding Korean Patent Application No. 2008-7023929, dated Aug. 27, 2010, 5 pgs.

Yu, Dachuan, et al., "A Typed Assembly Language for Confidentiality", DoCoMo USA Labs Technical Report DCL-TR-2005-0002, Mar. 2005, 14 pgs.

Smith, Geoffrey, et al., "Secure Information Flow in a Multi-threaded Imperative Language", Proceedings on $25^{th}$ ACM Symposium on Principles of Programming Languages, Jan. 19, 1998, 10 pgs.

Bonelli et al., "SIFTAL: A Typed Assembly Language for Secure Information Flow Analysis", Feb. 23, 2004, pp. 1-46, Department of Computer Science, Stevens Institute of Technology, Hoboken, New Jersey, USA.

BernArDeschi et al., "Checking secure information flow in Java bytecode by code transformation and standard bytecode verification", Software—Practice and Experience, Feb. 2004, pp. 1225-1255.

US Office Action for related U.S. Appl. No. 11/316,621, Jul. 7, 2011, 12 pgs.

Japanese Office Action for related Japanese Patent Application No. 2007-547056, Apr. 19, 2011, 4 pgs. *English Translation*.

US Final Office Action for related U.S. Appl. No. 11/316,621, Dec. 16, 2010, 11 pgs.

Crary et al., "A Monadic Analysis Of Information Flow With Mutable State", Carnegie Mellon University, 10 pgs.

Xi et al., "A Dependently Typed Assembly", Sep. 3, 2001, 12 pgs.

Brylow et al., "A Typed Assembly Language for Java", Jul. 26, 1999, pp. 1-47.

European Office Action for corresponding European Patent Application No. 07838294.2, Feb. 2, 2011, 5 pgs.

* cited by examiner

| | | |
|---|---|---|
| *(Types)* | $t, pc ::= \texttt{low} \mid \texttt{high}$ | |
| *(Environments)* | $\Phi ::= \circ \mid V:t, \Phi$ | |
| *(Expressions)* | $E ::= i \mid V \mid E_1 + E_2$ | |
| *(Commands)* | $C ::= \texttt{skip} \mid V := E \mid C_1; C_2 \mid \texttt{if } E \texttt{ then } C_1 \texttt{ else } C_2$ | |
| | $\quad \mid \texttt{while } E \texttt{ do } C$ | |

Figure 1A

[E1–2] $\quad \Phi \vdash E : \texttt{high} \qquad\qquad \Phi \vdash i : t$

[E3–4] $\quad \dfrac{\Phi(V) = \texttt{low}}{\Phi \vdash V : \texttt{low}} \qquad\qquad \dfrac{\vdash E_1 : \texttt{low} \quad \vdash E_2 : \texttt{low}}{\vdash E_1 + E_2 : \texttt{low}}$

[C1–2] $\quad \dfrac{\Phi(V) = \texttt{high}}{\Phi; [pc] \vdash V := E} \qquad\qquad \dfrac{\Phi(V) = \texttt{low} \quad \Phi \vdash E : \texttt{low}}{\Phi; [\texttt{low}] \vdash V := E}$

[C3] $\quad \dfrac{\Phi \vdash E : pc \quad \Phi; [pc] \vdash C_1 \quad \Phi; [pc] \vdash C_2}{\Phi; [pc] \vdash \texttt{if } E \texttt{ then } C_1 \texttt{ else } C_2}$

[C4–5] $\quad \dfrac{\Phi; [\texttt{high}] \vdash C}{\Phi; [\texttt{low}] \vdash C} \qquad\qquad \dfrac{\Phi; [pc] \vdash C_1 \quad \Phi; [pc] \vdash C_2}{\Phi; [pc] \vdash C_1; C_2}$

[C6] $\quad \dfrac{\Phi \vdash E : pc \quad \Phi; [pc] \vdash C}{\Phi; [pc] \vdash \texttt{while } E \texttt{ do } C}$

Figure 1B

| | |
|---|---|
| (contexts) | $\kappa ::= \bullet \mid \theta \triangleright l$ |
| (pre-types) | $\tau ::= \texttt{int} \mid \langle \sigma_1, \ldots, \sigma_n \rangle \mid \forall[].\langle \kappa \rangle \Gamma$ |
| (types) | $\sigma ::= \tau_\theta$ |
| (heap ty) | $\Psi ::= \{l_1 : \sigma_1, \ldots l_n : \sigma_n\}$ |
| (reg file ty) | $\Gamma ::= \{r_1 : \sigma_1, \ldots r_n : \sigma_n\}$ |
| (registers) | $r ::= r_1 \mid r_2 \mid \ldots$ |
| (word val) | $w ::= l \mid i$ |
| (small val) | $v ::= r \mid w$ |
| (heap val) | $h ::= \langle w_1, \ldots, w_n \rangle \mid \texttt{code}[]\langle \kappa \rangle \Gamma.I$ |
| (heaps) | $H ::= \{l_1 \mapsto h_1, \ldots, l_n \mapsto h_n\}$ |
| (reg files) | $R ::= \{r_1 \mapsto w_1, \ldots, r_n \mapsto w_n\}$ |
| (instr) | $\iota ::= \texttt{add } r_d, r_s, v \mid \texttt{ld } r_d, r_s(i) \mid \texttt{st } r_d(i), r_s$ |
| | $\mid \texttt{mov } r_d, v \mid \texttt{bnz } r, v \mid \texttt{raise } \kappa$ |
| (instr seq) | $I ::= \iota; I \mid \texttt{lower } l \mid \texttt{jmp } v \mid \texttt{halt } [\sigma]$ |
| (prog) | $P ::= (H, R, I)_\kappa$ |

Figure 2

A security-typed source program:  a := 0; if b then c := 1 else c := 0; a := 1
A corresponding $TAL_C$ program:  $(H, \{\}, \text{jmp } l_0)$. where $H = \{(l_a, l_b, l_c \text{ omitted})$ $l_0 \mapsto$  code[]⟨•⟩{}.
    mov $r_0, 0$;                     % $r_0 \leftarrow 0$
    mov $r_1, l_a$;                   % $r_1 \leftarrow l_a$
    mov $r_2, l_b$;                   % $r_2 \leftarrow l_b$
    mov $r_3, l_c$;                   % $r_3 \leftarrow l_c$
    st $r_1(0), r_0$;                % $l_a \leftarrow 0$
    raise $\top \triangleright l_3$;              % raise security context
    jmp $l_1$ $l_1 \mapsto$  code[]⟨$\top \triangleright l_3$⟩{$r_0 : \langle \text{int}_\bot \rangle_\bot, r_1 : \langle \text{int}_\bot \rangle_\bot, r_2 : \langle \text{int}_\top \rangle_\bot, r_3 : \langle \text{int}_\top \rangle_\bot$}.
    ld $r_4, r_2(0)$;
    bnz $r_4, l_2$;                 % go to $l_2$ if content of $l_b$ is not 0
    st $r_3(0), r_0$;                % the else branch: $l_c \leftarrow 0$
    lower $l_3$                    % restore security context and go to $l_3$ $l_2 \mapsto$  code[]⟨$\top \triangleright l_3$⟩{$r_0 : \langle \text{int}_\bot \rangle_\bot, r_1 : \langle \text{int}_\bot \rangle_\bot, r_2 : \langle \text{int}_\top \rangle_\bot, r_3 : \langle \text{int}_\top \rangle_\bot$}.
    mov $r_0, 1$;
    st $r_3(0), r_0$;                % the then branch: $l_c \leftarrow 1$
    lower $l_3$                    % restore security context and go to $l_3$ $l_3 \mapsto$  code[]⟨•⟩{$r_1 : \text{int}_\bot$}.
    mov $r_0, 1$;
    st $r_1(0), r_0$;                % $l_a \leftarrow 1$
    halt [$\text{int}_\bot$]
                                                                                                        }

Figure 3

A source program:     if b then c := 1 else c := 0
The target code:     (annotations are ∞ by default)

$l_0 \mapsto$     mov $r_0, 0$;     % $r_0 \leftarrow 0$
    mov $r_2, l_b$;     % $r_2 \leftarrow l_b$
    mov $r_3, l_c$;     % $r_3 \leftarrow l_c$
    raise $\top \triangleright l_3$;     % raise security context
    $\langle 5 \rangle$ ld $r_4, r_2(0)$;
    $\langle 4 \rangle$ bnz $r_4, l_2$;     % go to $l_2$ if $l_b$ is not 0
    $\langle 2 \rangle$ st $r_3(0), r_0$;     % the else branch: $l_c \leftarrow 0$
    $\langle 1 \rangle$ lower $l_3$     % restore sec. and go to $l_3$ $l_2 \mapsto$     $\langle 3 \rangle$ mov $r_0, 1$;
    $\langle 2 \rangle$ st $r_3(0), r_0$;     % the then branch: $l_c \leftarrow 1$
    $\langle 1 \rangle$ lower $l_3$     % restore sec. and go to $l_3$ $l_3 \mapsto$     ...

Figure 5

A source program:     while b do c := 0
The target code:     (annotations are ∞ by default)

$l_0 \mapsto$     mov $r_0, 0$;     % $r_0 \leftarrow 0$
    mov $r_2, l_b$;     % $r_2 \leftarrow l_b$
    mov $r_3, l_c$;     % $r_3 \leftarrow l_c$
    raise $\top \triangleright l_3$;     % raise security context $l_1 \mapsto$     $\langle \infty \rangle$ ld $r_4, r_2(0)$;
    $\langle \infty \rangle$ bnz $r_4, l_2$;     % go to $l_2$ if $l_b$ is not 0
    $\langle 1 \rangle$ lower $l_3$     % restore sec. and go to $l_3$ $l_2 \mapsto$     $\langle \infty \rangle$ st $r_3(0), r_0$;     % the loop body: $l_c \leftarrow 0$
    $\langle \infty \rangle$ jmp $l_1$     % return to loop test: $l_1$ $l_3 \mapsto$     ...

Figure 6

*(timing anno)*     $t ::= n \; (natural \; numbers) \mid \infty$
*(pre-type)*     $\tau ::= \text{int} \mid \langle \sigma_1, \ldots, \sigma_n \rangle \mid \forall[].\langle \kappa; t \rangle \Gamma$
*(heap val)*     $h ::= \langle w_1, \ldots, w_n \rangle \mid \text{code}[]\langle \kappa; t \rangle \Gamma.I$

Figure 7

| Judgment | Meaning |
| --- | --- |
| $\Gamma_1 \subseteq \Gamma_2$ | Register file type $\Gamma_1$ weakens $\Gamma_2$ |
| $\vdash H : \Psi$ | Heap $H$ has type $\Psi$ |
| $\Psi \vdash R : \Gamma$ | Register file $R$ has type $\Gamma$ |
| $\Psi \vdash h : \sigma$ | Heap value $h$ has type $\sigma$ |
| $\Psi \vdash w : \sigma$ | Word value $w$ has type $\sigma$ |
| $\Psi; \Gamma \vdash v : \sigma$ | Small value $v$ has type $\sigma$ |
| $\Psi; \Gamma; \kappa; t \vdash I$ | $I$ is a valid sequence of instructions |
| $\Psi; \Gamma; t \vdash P$ | $P$ is a valid program |
| $|comm| = n$ | Command $comm$ requires time $n$ |
| $\theta \vdash t \xrightarrow{t'} t''$ | Timing may change from $t$ to $t''$ after $t'$ |
| $\theta \vdash t$ | Timing $t$ is acceptable under security level $\theta$ |
| $\theta \vdash t \sim t'$ | $t$ and $t'$ match under security level $\theta$ |

Figure 8

$$comm \in \{\text{add}, \text{ld}, \text{st}, \text{mov}, \text{bnz}, \text{raise}, \text{lower}, \text{jmp}, \text{halt}\}$$
$$|comm| = 1$$

$$\frac{}{\bot \vdash t \xrightarrow{t'} t''} \qquad \frac{t \geq t' + t''}{\theta \vdash t \xrightarrow{t'} t''}$$

$$\frac{}{\bot \vdash t} \qquad \frac{t \neq \infty}{\theta \vdash t} \qquad \frac{}{\theta \vdash t \sim t'}$$

Figure 9

$$\frac{m \leq n}{\{r_1:\sigma_1 \ldots r_m:\sigma_m\} \subseteq \{r_1:\sigma_1 \ldots r_n:\sigma_n\}}$$

$$\frac{\Psi = \{l_1 : \sigma_1, \ldots l_n : \sigma_n\} \qquad \Psi \vdash h_i : \sigma_i}{\vdash \{l_1 \mapsto h_1, \ldots, l_n \mapsto h_n\} : \Psi}$$

$$\frac{\Gamma = \{r_1 : \sigma_1, \ldots r_n : \sigma_n\} \qquad \Psi \vdash w_i : \sigma_i}{\Psi \vdash \{r_1 \mapsto w_1, \ldots, r_n \mapsto w_n\} : \Gamma}$$

$$\frac{\Psi \vdash w_i : \sigma_i}{\Psi \vdash \langle w_1, \ldots, w_n \rangle : \langle \sigma_1, \ldots, \sigma_n \rangle_\theta}$$

$$\frac{\Psi; \Gamma; \kappa; t \vdash I}{\Psi \vdash \mathsf{code}[]\langle \kappa; t \rangle \Gamma.I : (\forall[].\langle \kappa; t \rangle\, \Gamma)_\theta}$$

$$\Psi \vdash i : \mathtt{int}_\theta \qquad \frac{\Psi(l) = \sigma}{\Psi \vdash l : \sigma}$$

$$\frac{\Gamma(r) = \sigma}{\Psi; \Gamma \vdash r : \sigma} \qquad \frac{\Psi \vdash w : \sigma}{\Psi; \Gamma \vdash w : \sigma}$$

$$\frac{\vdash H : \Psi \qquad \Psi \vdash R : \Gamma \qquad \Psi; \Gamma; \kappa; t \vdash I \qquad SL(\kappa) \vdash t}{\Psi; \Gamma; t \vdash (H, R, I)_\kappa}$$

Figure 10

$$SL(\kappa) = \theta \quad \Gamma(r_s) = \text{int}_{\theta_1} \quad \Psi; \Gamma \vdash v : \text{int}_{\theta_2}$$
$$\Psi; \Gamma\{r_d : \text{int}_{\theta \cup \theta_1 \cup \theta_2}\}; \kappa; t' \vdash I \quad \theta \vdash t \xrightarrow{|\text{add}|} t'$$
$$\overline{\Psi; \Gamma; \kappa; t \vdash \text{add } r_d, r_s, v; I}$$

$$SL(\kappa) = \theta \quad \Gamma(r_s) = \langle \sigma_1, \ldots, \sigma_n \rangle_{\theta_1} \quad \sigma_i = \tau_{\theta_2}$$
$$\Psi; \Gamma\{r_d : \tau_{\theta \cup \theta_1 \cup \theta_2}\}; \kappa; t' \vdash I \quad \theta \vdash t \xrightarrow{|\text{ld}|} t'$$
$$\overline{\Psi; \Gamma; \kappa; t \vdash \text{ld } r_d, r_s(i); I}$$

$$SL(\kappa) = \theta \quad \Psi; \Gamma \vdash v : \tau_{\theta'} \quad \Psi; \Gamma\{r_d : \tau_{\theta \cup \theta'}\}; \kappa; t' \vdash I$$
$$\theta \vdash t \xrightarrow{|\text{mov}|} t'$$
$$\overline{\Psi; \Gamma; \kappa; t \vdash \text{mov } r_d, v; I}$$

$$SL(\kappa) = \theta \quad \Gamma(r) = \text{int}_{\theta_1} \quad \Psi; \Gamma \vdash v : (\forall[].\langle \kappa; t' \rangle \Gamma')_{\theta_2}$$
$$\theta_1 \cup \theta_2 \subseteq \theta \quad \Gamma' \subseteq \Gamma \quad \Psi; \Gamma; \kappa; t'' \vdash I$$
$$\theta \vdash t \xrightarrow{|\text{bnz}|} t' \quad \theta \vdash t \xrightarrow{|\text{bnz}|} t'' \quad \theta \vdash t' \sim t''$$
$$\overline{\Psi; \Gamma; \kappa; t \vdash \text{bnz } r, v; I}$$

$$SL(\kappa) = \theta \quad \Gamma(r_d) = \langle \sigma_1, \ldots, \sigma_n \rangle_{\theta_1} \quad \sigma_i = \tau_{\theta'}$$
$$\Gamma(r_s) = \tau_{\theta_2} \quad \theta \cup \theta_1 \cup \theta_2 \subseteq \theta' \quad \Psi; \Gamma; \kappa; t' \vdash I$$
$$\theta \vdash t \xrightarrow{|\text{st}|} t'$$
$$\overline{\Psi; \Gamma; \kappa; t \vdash \text{st } r_d(i), r_s; I}$$

$$SL(\kappa) = \theta \quad \kappa' = \theta' \triangleright w' \quad \theta \subseteq \theta'$$
$$\Psi \vdash w' : (\forall[].\langle \kappa; t_1 \rangle \Gamma')_{\theta_1} \quad \Psi; \Gamma; \kappa'; t' \vdash I$$
$$\theta \vdash t \xrightarrow{|\text{raise}|} t' \quad \theta' \vdash t'$$
$$\overline{\Psi; \Gamma; \kappa; t \vdash \text{raise } \kappa'; I}$$

$$\kappa = \theta \triangleright w \quad \Psi \vdash w : (\forall[].\langle \kappa'; t' \rangle \Gamma')_{\theta_1}$$
$$\theta_1 \subseteq SL(\kappa') \quad \Gamma' \subseteq \Gamma$$
$$\theta \vdash t \xrightarrow{|\text{lower}|} t_1 \quad \text{where } t_1 = \begin{cases} 0 & \text{if } SL(\kappa') = \bot \\ t' & \text{otherwise} \end{cases}$$
$$\overline{\Psi; \Gamma; \kappa; t \vdash \text{lower } w}$$

$$SL(\kappa) = \theta \quad \Psi; \Gamma \vdash v : (\forall[].\langle \kappa; t' \rangle \Gamma')_{\theta_1}$$
$$\theta_1 \subseteq \theta \quad \Gamma' \subseteq \Gamma \quad \theta \vdash t \xrightarrow{|\text{jmp}|} t'$$
$$\overline{\Psi; \Gamma; \kappa; t \vdash \text{jmp } v}$$

$$\kappa = \bullet \quad \Gamma(r_1) = \sigma$$
$$\overline{\Psi; \Gamma; \kappa; t \vdash \text{halt }[\sigma]}$$

Figure 11

[TREconst]  $|\mathtt{i}| = \mathtt{mov}\ r, i \parallel r; |\mathtt{mov}|$

[TREvar]  $|\mathtt{v}| = \mathtt{mov}\ r, l_{\mathtt{v}}; \mathtt{ld}\ r', r(0) \parallel r'; |\mathtt{mov}| + |\mathtt{ld}|$

[TREadd]  $\dfrac{|\mathtt{E}| = \vec{\iota} \parallel r; t \quad |\mathtt{E}'| = \vec{\iota'} \parallel r'; t' \quad \vec{\iota'}\ \text{does not use}\ r \quad t'' = t + t' + |\mathtt{add}|}{|\mathtt{E} + \mathtt{E}'| = \vec{\iota}; \vec{\iota'}; \mathtt{add}\ r'', r, r' \parallel r''; t''}$

Figure 12

[TRC1] $$\dfrac{\dfrac{\Phi(V) = \text{high}}{\Phi;[\text{pc}] \vdash V := E} \quad |E| = \vec{\iota} \parallel r; t_1 \quad t' = t + t_1 + |\text{mov}| + |\text{st}| + |\text{jmp}|}{\begin{bmatrix} \Psi \\ H \\ l; l':t; \kappa \end{bmatrix} = \begin{bmatrix} \Psi\{l : (\forall[].\langle \kappa; t' \rangle \{\})_\perp\} \\ H\{l \mapsto \text{code}[]\langle \kappa; t' \rangle\{\}.\vec{\iota}; \text{mov } r', l_v; \text{st } r'(0), r; \text{jmp } l'\} \\ t' \end{bmatrix}}$$

[TRC2] $$\dfrac{\dfrac{\Phi(V) = \text{low} \quad \Phi \vdash E : \text{low}}{\Phi;[\text{low}] \vdash V := E} \quad |E| = \vec{\iota} \parallel r; t_1 \quad t' = \infty}{\begin{bmatrix} \Psi \\ H \\ l; l':t; \bullet \end{bmatrix} = \begin{bmatrix} \Psi\{l : (\forall[].\langle \bullet; t' \rangle \{\})_\perp\} \\ H\{l \mapsto \text{code}[]\langle \bullet; t' \rangle\{\}.\vec{\iota}; \text{mov } r', l_1; \text{st } r'(0), r; \text{jmp } l'\} \\ t' \end{bmatrix}}$$

[TRC3] $$\dfrac{\Phi \vdash E : \text{pc} \quad \dfrac{\text{TD}_1}{\Phi;[\text{pc}] \vdash C_1} \quad \dfrac{\text{TD}_2}{\Phi;[\text{pc}] \vdash C_2}}{\Phi;[\text{pc}] \vdash \text{if } E \text{ then } C_1 \text{ else } C_2}$$
with $|E| = \vec{\iota} \parallel r; t_0$, $l_1, l_2$ are fresh labels, $t' = t_0 + \max\{(t_1 + |\text{bnz}|), (l_2 + |\text{bnz}| + |\text{jmp}|)\}$ $$\begin{bmatrix} \Psi \\ H \\ l; l':t; \kappa \end{bmatrix} = \begin{bmatrix} \Psi_2\{l : (\forall[].\langle \kappa; t' \rangle \{\})_\perp\} \\ H_2\{l \mapsto \text{code}[]\langle \kappa; t' \rangle\{\}.\vec{\iota}; \text{bnz } r, l_1; \text{jmp } l_2\} \\ t' \end{bmatrix}$$

[TRC4] $$\dfrac{\dfrac{\text{TD}}{\Phi;[\text{high}] \vdash C}}{\dfrac{\Phi;[\text{high}] \vdash C}{\Phi;[\text{low}] \vdash C}}$$
$l_0, l_1$ are fresh labels, $t_1 = |\text{lower}|$, $t' = t_2 + |\text{raise}| + |\text{jmp}|$

[TRC5] $l_1$ is a fresh label
$$\dfrac{\dfrac{\text{TD}_1}{\Phi;[\text{pc}] \vdash C_1} \quad \dfrac{\text{TD}_2}{\Phi;[\text{pc}] \vdash C_2}}{\Phi;[\text{pc}] \vdash C_1; C_2}$$

[TRC6] $$\dfrac{\text{pc} = \text{low} \quad \Phi \vdash E : \text{pc} \quad \dfrac{\text{TD}}{\Phi;[\text{pc}] \vdash C}}{\Phi;[\text{pc}] \vdash \text{while } E \text{ do } C}$$

Figure 13

$$\frac{comm \text{ is any instruction}}{|comm| = t_{comm}}$$

$$\frac{}{\bot \vdash t \xrightarrow{t'} t''} \qquad \frac{t = t' + t''}{\theta \vdash t \xrightarrow{t'} t''}$$

$$\frac{}{\bot \vdash t} \qquad \frac{t <> \infty}{\theta \vdash t}$$

$$\frac{t = t'}{\theta \vdash t \sim t'}$$

Figure 14

A source program:   if b then c := 1 else c := 0
The target code:    (some annotations are omitted)

$l_0 \mapsto$
      mov $r_2, l_b$;  % $r_2 \leftarrow l_b$
      mov $r_3, l_c$;  % $r_3 \leftarrow l_c$
      raise $\top \triangleright l_3$;  % raise security context
      ld $r_4, r_2(0)$;
      bnz $r_4, l_2$;  % go to $l_2$ if $l_b$ is not 0
  $\langle t_{mov}\ t_{st}\ t_{lower} \rangle$ mov $r_0, 0$;  % $r_0 \leftarrow 0$
    $\langle t_{st}\ t_{lower} \rangle$ st $r_3(0), r_0$;  % the else: $l_c \leftarrow 0$
      $\langle t_{lower} \rangle$ lower $l_3$  % restore sec. and go to $l_3$ $l_2 \mapsto \langle t_{mov}\ t_{st}\ t_{lower} \rangle$ mov $r_0, 1$;
    $\langle t_{st}\ t_{lower} \rangle$ st $r_3(0), r_0$;  % the then: $l_c \leftarrow 1$
      $\langle t_{lower} \rangle$ lower $l_3$  % restore sec. and go to $l_3$ $l_3 \mapsto$       . . .

Figure 15

$$[TRC3']\ \dfrac{\begin{array}{c}|E|=\vec{\iota}\|\,r;t_0 \qquad l_1,l_2\text{ are fresh labels} \qquad t'_1=t_1+|\mathtt{jmp}| \qquad t'=t_0+t'_1+|\mathtt{bnz}| \\[4pt] \left|\dfrac{TD_1}{\Phi;[\mathrm{pc}]\vdash C_1}\right|\ \left[\begin{array}{c}\Psi\\H\\l_1;l':t;\kappa\end{array}\right]=\left[\begin{array}{c}\Psi_1\\H_1\\t_1\end{array}\right] \qquad \left|\dfrac{TD_2}{\Phi;[\mathrm{pc}]\vdash C_2}\right|\ \left[\begin{array}{c}\Psi_1\\H_1\\l_2;l':t;\kappa\end{array}\right]=\left[\begin{array}{c}\Psi_2\\H_2\\t_2\end{array}\right] \\[18pt] \left|\dfrac{\Phi\vdash E:\mathrm{pc}\quad \dfrac{TD_1}{\Phi;[\mathrm{pc}]\vdash C_1}\quad \dfrac{TD_2}{\Phi;[\mathrm{pc}]\vdash C_2}}{\Phi;[\mathrm{pc}]\vdash \text{if }E\text{ then }C_1\text{ else }C_2}\right|\ \left[\begin{array}{c}\Psi\\H\\l;l':t;\kappa\end{array}\right]=\left[\begin{array}{c}\Psi_2\left\{\begin{array}{l}l\ :(\forall[].\langle\kappa;t'\rangle\{\})_\bot\\l'_1:(\forall[].\langle\kappa;t'_1\rangle\{\})_\bot\end{array}\right\}\\H_2\left\{\begin{array}{l}l\mapsto\mathtt{code}[]\langle\kappa;t'\rangle\{\}.\vec{\iota};\mathtt{bnz}\ r,l'_1;\mathtt{jmp}\ l_2\\l'_1\mapsto\mathtt{code}[]\langle\kappa;t'_1\rangle\{\}.\mathtt{jmp}\ l_1\end{array}\right\}\\t'\end{array}\right]\end{array}}$$

Figure 16

Initially:    f = 0
Thread 0:    if h then f := 1 else f := 2
Thread 1:    while f <> 1 do skip;
              l := false;
              f := 2;
Thread 2:    while f <> 2 do skip;
              l := true;
              f := 1;

Figure 17

Thread 0:    if h then $C_{long}$ else skip;
              l := true;
Thread 1:    if h then skip else $C_{long}$;
              l := false;

Figure 18

INFORMATION FLOW ENFORCEMENT FOR RISC-STYLE ASSEMBLY CODE IN THE PRESENCE OF TIMING-RELATED COVERT CHANNELS AND MULTI-THREADING

PRIORITY

The present patent application claims priority to and incorporates by reference the corresponding provisional patent application Ser. No. 60/844,974, titled, "Information Flow Enforcement for RISC-style Assembly Code in the Presence of Timing-Related Covert Channels and Multi-Threading," filed on Sep. 14, 2006.

RELATED APPLICATIONS

This application is related to the co-pending application entitled, "Information Flow Enforcement for RISC-Style Assembly Code," filed on Dec. 19, 2005, U.S. patent application Ser. No. 11/316,621, assigned to the corporate assignee of the present invention.

FIELD OF THE INVENTION

The present invention relates to the field of program execution and security; more particularly, the present invention relates to enforcing information flow constraints on assembly code.

BACKGROUND OF THE INVENTION

An information-flow problem typically concerns a program that operates on data of different security levels (e.g., low and high). For purposes herein, low data are public data that may be disclosed to all principals, and high data are secret data whose access must be restricted. An information-flow policy, such as noninterference, typically requires that no information about high input data can be inferred from observing low output data. In practice, the security levels can be generalized to a lattice.

Language-based techniques have been shown promising in addressing such information-flow problems. By directly examining the program code, these techniques provide a strong guarantee on information-flow security. Nonetheless, most existing language-based information-flow techniques focus on high-level languages. They do not apply to assembly code largely due to the lack of high-level abstractions (e.g., program structures and data structures) and the extreme flexibility (e.g., memory aliasing and first-class code pointers) of assembly code.

It is useful to address information-flow problems for assembly code, because some applications are distributed (e.g., native code for mobile computation) or even directly written (e.g., embedded systems) in assembly code. A type system has been proposed in such a context. More specifically, that type system uses type annotations to restore the missing abstraction in assembly code, and uses type-preserving compilation to preserve security evidence from the source to the target. By security-type checking directly at the target level, code consumers gain confidence that the behavior of untrusted code satisfies certain desired information-flow policies.

Attackers may sometimes also be able to exploit covert information-flow channels, such as program timing behaviors. By either observing physically the execution time of a program (external timing) or exploiting thread interaction (internal timing), attackers may learn information about secret data. It is therefore useful to have a solution that protects information-flow security in the presence of such timing-related covert channels, particularly for assembly code with its lack of abstraction and extreme flexibility.

With respect to prior solutions on covert channels and multi-threading, Volpano and Smith, "Eliminating Covert Flows with Minimum Typings," 10th IEEE Computer Security Foundations Workshop, pages 156-169, Washington, D.C., June 1997, studied termination-sensitive noninterference, and proposed a type system that closes termination channels by disallowing loops from occurring at sensitive program points. Agat, in "Transforming Out Timing Leaks," Proc. 27th ACM Symposium on Principles of Programming Languages, pages 40-53, Boston, Mass., January 2000, used program transformation to prevent timing leaks, where the execution times of high branches are equalized by cross-padding with appropriate dummy instructions. Smith and Volpano, "Secure Information Flow in a Multi-Threaded Imperative Language," Proc. 25th ACM Symposium on Principles of Programming Languages, pages 355-364, San Diego, Calif., January 1998, established possibilistic noninterference for a multi-threaded language by, again, disallowing loops from occurring at sensitive program points. Sabelfeld and Sands, "Probabilistic Noninterference for Multi-Thread Programs," Proc. 13th IEEE Computer Security Foundations Workshop, pages 200-214, Cambridge, UK, July 2000, proved a probabilistic noninterference result with respect to a scheduler-independent security condition. These systems address information-flow security for source-level programs, and are not applicable to assembly code.

From the perspective of typed assembly languages, there has been some recent effort toward enforcing information-flow security directly at the target-code level. However, none of this work tackled covert channels and/or multi-threading. This presents difficulty when applying the solutions to real-world scenarios, where covert channels and threads interaction are easily exploitable.

SUMMARY OF THE INVENTION

A method and apparatus is disclosed for performing information flow enforcement for assembly code. In one embodiment, the method comprises receiving assembly code having timing annotations with type information that enforce information flow with respect to one or more of timing-related covert and concurrent channels when statically checked as to whether the code is in violation of a security policy and performing verification with respect to information flow for the assembly code based on a security policy.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1A illustrates an example of an imperative language.

FIG. 1B illustrates a simple security-type system.

FIG. 2 illustrates the syntax of a simplified version of $TAL_C$.

FIG. 3 illustrates an example $TAL_C$ program, which is the target code translated from a security-typed source program.

FIG. 5 illustrates one embodiment of timing annotations for a conditional.

FIG. 6 illustrates one embodiment of timing annotations for a loop.

FIG. 7 illustrates one embodiment of a $TAL_C^+$ syntax extension.

FIG. 8 illustrates one embodiment of $TAL_C^+$ typing judgments.

FIG. 9 illustrates one embodiment of timing rules for closing termination channels.

FIG. 10 illustrates one embodiment of $TAL_C^+$ typing rules for non-instructions.

FIG. 11 illustrates one embodiment of $TAL_C^+$ typing rules for instructions.

FIG. 12 illustrates one embodiment of expression translation.

FIG. 13 illustrates one embodiment of command translation.

FIG. 14 illustrates one embodiment of timing rules for closing timing channels.

FIG. 15 illustrates one embodiment of extended timing annotations for a conditional.

FIG. 16 illustrates translating conditionals in the presence of timing channels.

FIG. 17 illustrates an example of possibilistic non-interference.

FIG. 18 illustrates an example of probabilistic non-interference.

DETAILED DESCRIPTION OF THE PRESENT INVENTION

Figure 4A:
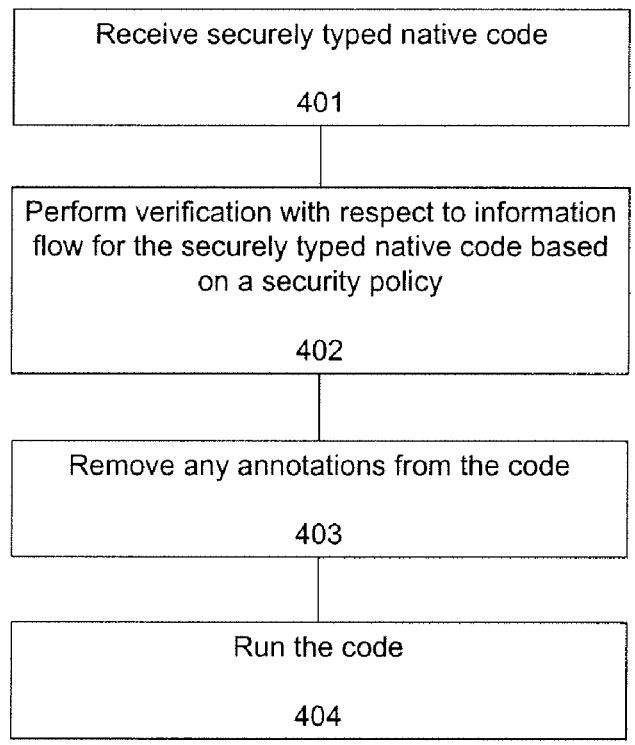
FIG. 4A is a flow diagram of a process for information flow enforcement.

Information flow enforcement for assembly code (e.g., RISC-style assembly code) in the presence of timing-related covert channels and multi-threading are disclosed. Embodiments of the present invention are related to the field of type systems that guarantee information-flow security for RISC-style assembly code. The assembly code is augmented with typing annotations. Type checkers guided by typing rules examine the augmented code and determine whether the code satisfies certain information-flow policies.

Embodiments of the present invention protects information-flow security for both sequential and multi-threaded code and is applicable even if attackers may access timing-related covert channels. In different embodiments, the present invention handles information-flow security in the presence of termination, timing, possibilistic and/or probabilistic channels.

A series of type systems for the information-flow security of assembly code are disclosed. These systems include timing annotations and associated judgments and rules. By using different timing rules, these systems are applicable to different practical settings. In particular, they can be used to prevent illicit information flow through the termination and timing channels in sequential programs as well as the possibilistic and probabilistic channels in multi-threaded programs.

Presented below are the formal details of these type systems as a generic type system $TAL_C^+$ and demonstrate its use in certifying compilation. By using different "parameters" of $TAL_C^+$, a series of type systems and certifying compilation schemes can be obtained, addressing termination-sensitive, timing-sensitive, possibilistic, and probabilistic noninterference policies respectively. In addition, a combination of the "parameters" can be used to achieve a system that addresses a combination of the above policies.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Security-Type System

A brief explanation on how to use a type system to address information-flow security for source languages is given below.

Consider the simple language given in FIG. 1A. Two security levels are used in this language: low and high. An environment ($\Phi$) specifies the security levels (t) of variables (V). For convenience, h (and $h_1, h_2 \ldots$) and l (and $l_1, l_2, \ldots$) are used to denote high and low variables, respectively. Expressions (E) are either constants (i), variables (V) or additions. Commands (C) are all common. A policy that there should be no flow of information from high variables to low variables is desired. More specifically, several kinds of illicit information flow are prevented, such as the following:

1. Explicit flow through assignments, such as l:=h.
2. Implicit flow through program structures (conditionals and while-loops), such as if h then l:=1 else l:=0.
3. If extended with first-class objects and/or functions, there will be additional implicit flow through data and/or code pointers.

For the above simple language, a security-type system typically comprises the following:

1. To track security levels in the types of expressions. This helps in preventing information leak through explicit flow—mismatch of security levels in assignments will be disallowed.
2. To mark the program counters (PC) with security levels. If a conditional expression has a high guard, its branches will be type-checked under a high PC. This essentially marks the branches as falling in a "sensitive region," under which updates to low variables are disallowed. This idea applies also to other program structures such as while-loops.
3. In languages with pointers, pointers are given two security levels—one for the pointer, the other for the data or code being referenced. Illicit flow through pointers can be prevented with appropriate checks on the two security levels when the pointers are accessed.

FIG. 1B shows a simple security-type system that reflects the first two of these ideas. The rules there would be well-understood by one skilled in the art. Note that Rule [C4] (subsumption) helps to allow the inclusion of high computations in low security contexts—if it is secure to execute some code in a sensitive context, then it is also secure to execute the same code in an insensitive context.

$TAL_C$ $TAL_C$ is described in US2005000316621, entitled "Information Flow Enforcement for RISC-style Assembly Code," filed on Dec. 19, 2005, and assigned to the corporate assignee of the present invention, and addresses information-flow problems for assembly code. One of the main challenges described therein is that assembly code does not present as much abstraction as source code. Whereas the program structures of source code help to determine the security levels of various program points, such structures are not available in assembly code. For example, a conditional statement in a source program can be checked so that both branches respect the security level of the guard expression. Such checks are difficult in assembly code, where the "flattened" control flow provides little help in identifying program structures. A conditional is typically translated into a branching instruction and some code blocks, where the end points of the branches are not obvious.

$TAL_C$ recovers the missing structure using type annotations. These annotations provide explicit information on the security levels of instructions as well as the ending points of the security levels. In one embodiment, two security operations are used to manipulate the annotations, and appropriate typing rules are used to make sure that the annotations faithfully reflect the actual structure of the code.

The syntax of a simplified version of $TAL_C$ is given in FIG. 2. Compared with the original $TAL_C$, stacks and polymorphism have been omitted because they were mainly for supporting functions and procedures in source programs and their handling is orthogonal to the extensions described herein. The symbol $\theta$ is used to represent security levels. A security context $\theta \triangleright l$ indicates that the security level of the PC should be no less than $\theta$ until the program point l is reached.

A raise $\kappa$ operation is used to increase the security level, which corresponds to the beginning of a sensitive region such as those introduced by a high conditional. A lower l is used to restore the security level, which marks the end of a sensitive region. These two security operations can be placed into the target code by a certifying compilation process based on the structures and the typing of source programs.

Given these, the security levels of all program points become apparent through the annotations (the contexts). High branching occurs in high contexts, and assignments to low data in high contexts are disallowed. In addition, every reference cell is given two security levels—one for the pointer, the other for the referenced data or code.

In FIG. 3, an example $TAL_C$ program is given, which is translated from a security-typed source program. The source program involves a low variable a and two high variables b and c. In the corresponding $TAL_C$ program, heap cells labeled $l_a$, $l_b$ and $l_c$ are used to represent these variables. The $TAL_C$ program starts from the code labeled $l_0$ in a low security context •. After the initial setup, it raises the security context to $T \triangleright l_3$, where T represents the security level high. The control is then transferred to the code labeled $l_1$, which contains a test on the high variable b and directs the execution to two separate branches. In either branch of the conditional, the high variable c is updated, and the security context is restored with lower $l_3$. The code at $l_3$ is then free to update the low variable a again.

For more details, including the support for functions and pointers, the exact semantics and correctness proof, and a certifying compilation scheme targeting $TAL_C$, see Yu and Islam, "A Typed Assembly Language for Confidentiality," Technical Report DCL-TR-2005-0002, DoCoMo Communications Laboratories USA, San Jose, Calif., March 2005, http://www.docomolabsresearchers-usa.com/-dyu/talc-tr.pdf.

Below, a series of extensions to $TAL_C$ applicable under various security assumptions are described, which bridge the gap between low-level type systems for noninterference and practical applications. In particular, these extensions all fit in a generic framework described below and referred to herein as $TAL_C^+$. In this manner, a generic typed assembly language is available for "customized" noninterference (termination-sensitive, timing-sensitive, possibilistic, probabilistic, and plain).

Timing-Related Channels

Embodiments are described herein that may be used to address information-flow security for assembly code in several practical settings. For sequential programs, type systems for closing up some covert channels are described, including termination and timing channels. For multi-threaded programs, type systems that guarantee possibilistic and probabilistic noninterference are described. In one embodiment, a previously described type system $TAL_C$ is extended to include additional annotations to document the timing of program execution. These timing annotations are used to express various source-level constraints, such as the absence of loops in high security contexts.

Different timing annotations are used to address different information-flow channels. Nonetheless, there is much similarity between the underlying type systems. A formulation of a generic type system $TAL_C^+$ is given which addresses different information-flow channels when given different "timing rules." The details of embodiments of the present invention are given in terms of the generic type system. By giving this generic type system different "parameters," a specialized type systems for different situations is obtained.

FIG. 4A is a flow diagram of one embodiment of a process for information flow enforcement. The process is performed by processing logic that may comprise hardware (e.g., circuitry, dedicated logic, etc.), software (such as is run on a general purpose computer system or a dedicated machine), or a combination of both.

Referring to FIG. 4A, the process begins by processing logic receiving assembly, or other securely typed native, code (processing block 401). In one embodiment, processing logic receives the code via downloading or retrieving the code from a network location.

In one embodiment, the securely typed native code comprises assembly code that has undergone a security-type preserving translation that includes annotating the assembly code with type information and timing annotations that enforce information flow with respect to one or more of timing-related covert and concurrent channels when statically checked as to whether the code is in violation of a security policy. In one embodiment, the concurrent channels are associated with multi-threading. In one embodiment, the timing-related covert channels comprise one or more of termination channels, timing channels, possibilistic channels, and probabilistic channels.

In one embodiment, the timing annotations express source-level constraints. In one embodiment, the timing annotations include one or more of a group consisting of a first annotation that specifies a time value indicative of an amount of time a command requires to execute, a second annotation that specifies that timing associated with a command may change after a specified period of time, a third annotation that specifies an acceptable timing for a command to execute under a specified security level, and a fourth annotation that specifies that the timing associated with a command matches a passage of time under a specified security level. In one embodiment, the timing annotations are indicative of execution time associated with an observable action sequence to enable observation of timing information associated with execution of a portion of the assembly code. In one embodiment, the timing annotations enable checking to indicate that both branches of a branching instruction exhibit the same timing behavior. In one embodiment, both branches of the branching instruction exhibit the same timing behavior when the branches meet in a same amount of time at the end of the code identified at a particular security level. In one embodiment, the timing annotations enable checking to ensure that no outputs or updates to variables of a first security level occur in a region of the code having a second security level that is higher than the first security level. In one embodiment, the annotations also comprise operations to mark a beginning and an ending of a region of the code in which two execution paths based on predetermined information are encountered.

After receiving the code, processing logic performs verification with respect to information flow for the securely typed native code based on a security policy (processing block 402). Verification is performed on a device (e.g., a mobile device such as a cellular phone) prior to the device running the code. In one embodiment, processing logic performs verification by statically checking behavior of the code to determine whether the code does not violate the security policy. In one embodiment, the code does not violate the security (safety) policy if the code, when executed, would not cause information of an identified type to flow from a device executing the code. In other words, it verifies the information flow that would occur under control of the assembly code when executed.

If verification determines the code does not violate the security policy, processing logic removes any annotations from the code (processing block 403) and runs the code (processing logic 404).

Figure 4B:
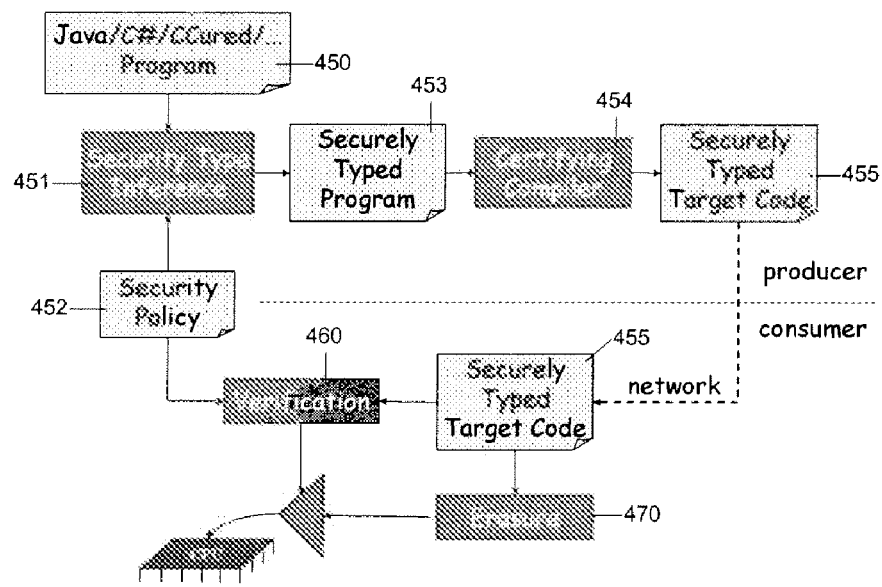
FIG. 4B illustrates an environment in which the information flow enforcement of FIG. 4A may be implemented.

FIG. 4B illustrates an environment in which the information flow enforcement of FIG. 4A may be implemented. Referring to FIG. 4B, a program 450 is subjected to a security type inference 451 based on a security policy 452. The result is a securely typed program 453. A certifying compiler 454 compiles program 453 and, as a result, produces securely typed target code 455.

Securely typed target code 455 may be downloaded by a consumer device. The consumer device may be a cellular phone or other mobile device, such as, for example, described below. The consumer device runs a verification module 460 on securely typed target code 455 before running code 455. The verification module 460 performs the verification based on security policy 452, acting as a type checker.

The consumer device also runs an erasure module 470 on securely typed target code 455 to erase annotations that were added to the code by certifying compiler 454 before running code 455.

If the verification module 460 determines that the code is safe or otherwise verifies the code is acceptable based on security policy 452, verification module 460 signals the consumer device that securely typed target code 455 may be run by the consumer device (e.g., a processor on the consume device).

The details of various embodiments of the invention are described below using an abstract language $TAL_C^+$.

Termination Channels

The techniques described herein are used to address several different problems related to information-flow security. For ease of understanding, termination channels in sequential programs are discussed in more detail below.

$TAL_C$ assumes that the means for observing program behaviors is by inspecting the content of program variables (or heap and register file for assembly code). In practice, there are some covert channels beyond variables. One representative example is the termination channel. More specifically, an attacker could also observe whether a program terminates.

By exploiting the termination channel, attackers may compose illicit information flow. In the following two examples, no low variable is updated. Nonetheless, the values of the high variable h can be learned by observing whether the programs terminate.

1. Nonterminating high loop: while h do skip;
2. Nonterminating loop in high conditional: if h then
   {while true do skip} else skip.

In one embodiment, all while-loops are restricted to have the minimum typing low. Note that this is a conservative approach, because even terminating loops are considered potentially non-terminating. This reflects in the type system as allowing a while-loop only under a low program counter (PC). More specifically, one needs to change only one typing rule, namely [C6], in the type system of FIG. 1B so that the PC must be low for loops.

$$\frac{pc = \text{low } \Phi \vdash E: pc\ \Phi;[pc] \vdash C}{\Phi;[pc] \vdash \text{while } E \text{ do } C} \quad [C6']$$

This change closes the termination channels in source-level programs. In the first example earlier, the high loop is now disallowed, because the high guard of the loop cannot be typed under a low PC. In the second example, the loop in the high conditional is now also disallowed, because the body of the high conditional has a high PC, but a loop is allowed only under a low PC. In essence, the loop structures are the key to such analysis, because it helps to enforce that high branches should be terminating. Although applicable to source programs, the above solution does not work for assembly code.

In a typed assembly language, one cannot easily identify loops, because both loops and conditionals are implemented using branching instructions. In one embodiment, the termination of high branches is enforced with specially designed annotation. The security annotations of $TAL_C$ are handy for identifying high branches—a branch is high if and only if it has a high context. In one embodiment, on top of this, some additional timing annotations that mark the upper bound of their execution steps before returning to low regions, are attached to high branches. The solution of $TAL_C$ guarantees that terminating high branches will meet eventually in a low region with matching low variables. The additional timing annotations are to guarantee that high branches do terminate.

More specifically, in one embodiment, a timing tag t is used for this purpose, where t is either a natural number (indicating that the execution will leave the current high region in at most this number of steps) or $\infty$ (indicating "unknown" or "potentially infinite"). Under a high context, the type system allows a branching instruction only if both branches have finite timing tags. In other words, upon a high branching, two executions of a program may split but will meet in a low region in a finite number of steps. This prevents potentially non-terminating "backward jumps" in the future. Note that the two branches of a branching instruction may have different timing tags. When giving a timing tag to the branching instruction itself (needed for nested branches), one takes the longer branch into account, because the timing tag is essentially an upper bound of the execution steps before exiting the current high region.

These timing annotations can come from the compilation of security-typed source code. In one embodiment, a conditional will be compiled with finite timing if and only if both branches yield finite timing, and a loop will be compiled conservatively with infinite timing. This is illustrated in FIGS. 5 and 6 (both b and c are high variables), where only timing annotations and other annotations are omitted to avoid obscuring the present invention.

Note that loops can only be typed with $\infty$. Inspecting the case in FIG. 6, no finite timing would work for the backward jump of jmp $l_1$ in code block $l_2$. Based on the similar reasoning, the two source-level counter-examples given earlier cannot be typed with finite timing. By accepting only finite timing annotations in high regions, a type system would reject those loops.

Such timing annotations can also support non-recursive loop-free functions, because the function bodies can be given finite timing annotations. To support code reuse, it is useful to introduce a simple form of polymorphism, as in the following example.

f: $\forall m.\ \langle m+3 \rangle \{r_0: \langle m \rangle\}$ do something that costs 2

$\langle m+1 \rangle$jmp $r_0$

This "post-timing" polymorphism essentially declares multiple copies of the same function for different typing contexts. In one embodiment, the decision as to which copy to use is decided by a use site with a type instantiation.

In summary, closing termination channels is performed by disallowing potentially non-terminating constructions (e.g., loops and recursive functions) in high contexts. The support for abnormal termination, such as uncaught exceptions caused by partial operations, in assembly code is straightforward by disallowing partial operations in high regions.

$TAL_C^+$

A typed assembly language $TAL_C^+$ implementing the above ideas is described below. In particular, $TAL_C^+$ is an extension to $TAL_C$ (the version in FIG. 2 is used, where features orthogonal to timing behaviors are omitted as explained therein).

Following $TAL_C$, it is assumed that security labels form a lattice $\mathcal{L}$. The variable $\theta$ is used to range over elements of $\mathcal{L}$. The symbols $\bot$ and $\top$ are used as the bottom and top of the lattice, $\cup$ and $\cap$ as the lattice join and meet operations, and $\sqsubseteq$ as the lattice ordering.

One embodiment of the syntax extension is given in FIG. 7. Timing annotations t are either natural numbers $n$ or the special $\infty$. They accompany security contexts $\kappa$ in code types and code values.

In FIG. 8, typing judgments are extended for the timing annotations. Instruction sequences and programs are further checked with respect to t. In one embodiment, four judgment forms of timing annotations are used. By using different definitions of these four judgment forms, type systems are obtained for closing different information channels. For termination channels, the definitions are in FIG. 9. Definitions for other channels are described further below.

The judgment $|\text{comm}|=n$ is designed to track the progress of time during program execution. With respect to termination, it suffices to consider any assembly command (or security operation) as consuming one unit of time. The passage of time $$\theta \vdash t \xrightarrow{t'} t''$$

is irrelevant in low security contexts $\bot$. In other security contexts, it requires that t be no less than the sum of t' and t". Here the addition + is extended straightforwardly to work with $\infty$. Any timing is acceptable under a low security context $\bot$. In contrast, under high security contexts, a timing is acceptable if and only if it is finite. Finally, matching timing $\theta \vdash t \sim t'$ is defined to hold trivially, since it does not play a role for termination channels. It is a placeholder for the extensions in later sections.

One embodiment of the extended typing rules is illustrated in FIGS. 10 and 11. In one embodiment, in $TAL_C^+$, only a few changes are made to $TAL_C$ on the rules for non-instructions. Notably, there is an extra invariant in the rule for checking programs, namely the timing t must be OK with respect to the security level of the context $\kappa$. In this case, $SL(\kappa)$ is used to refer to the security label component of $\kappa$, and $SL(\bullet)$ is defined to be $\bot$.

In one embodiment, the rules for add, ld, mov and st that are shown in FIG. 11 are all extended in the same way. Referring to FIG. 11, an extra check on the passage of time is used to make sure that the timing annotations match the actual instructions. The instruction bnz has two potential successors. Therefore, both branches are checked with respect to the passage of time. The matching judgment trivially holds for now.

In one embodiment, upon entering a new security context marked by raise, the new timing t' is checked to determine it is OK under the new security level θ'. In addition, the passage of time is also checked, which is useful in a multi-level security lattice where the current security level θ might not be ⊥. There is no need to check the timing $t_1$ of the end point ω' of the new context κ' directly at this point. In one embodiment, for lower, the passage of time being OK under θ is checked. In the case of going to the lowest security level, this trivially holds.

In one embodiment, for jmp, the passage of time is checked. In one embodiment, nothing special is needed for halt. $TAL_C$ allows halt only in the empty security context. In such a context, all timing annotations are OK.

Certifying Compilation

In one embodiment, a translation is used that preserves security-types from a minimal source language. More specifically, this source language is the one in FIG. 1A with its type system in FIG. 1B adapted with Rule [C6']. This allows a concise presentation, yet suffices in demonstrating the main contribution: the use of timing annotations to close up termination channels in assembly code.

The low-high security hierarchy of FIG. 1A defines a simple lattice consisting of two elements: ⊥ and T. The notation |t| denotes the translation of source type t in $TAL_C^+$: |low|≡$int_⊥$ and |high|≡$int_T$.

The program translation is assumed to start in a heap $H_0$ and a heap type $\psi_0$ which satisfy ⊢$H_0$:$\psi_0$ and contain entries for all the variables of the source program. For any source variable v that Φ(v)=t, there exists a location $l_v$ in the heap such that $\psi(l_v)$=⟨|t|⟩$_⊥$. This correspondence is referred to herein as Φ~$\psi$.

Expression translation of the form |E|= $\vec{\iota}$ ||r;t is defined in FIG. 12. The instruction vector $\vec{\iota}$ computes the value of E, and the result is put in the register r. The time needed to complete $\vec{\iota}$ is t.

In FIG. 13, the definition of command translation is based on the structure of the typing derivation of the source program. Which translation rule to apply is determined by the last typing rule used to check the source command. Typing derivations (possibly multiple) are denoted using TD. In particular, in one embodiment, the command translation has the form:

$$\left|\frac{TD}{[pc] \vdash C}\right| \begin{bmatrix} \Psi \\ H \\ l_{start}; l_{end}: t; \kappa \end{bmatrix} = \begin{bmatrix} \Psi' \\ H' \\ t' \end{bmatrix}.$$

The 6 arguments are: a code heap type $\psi$, a code heap H, starting and ending labels $l_{start}$ and $l_{end}$ for the computation of C, the timing annotation t of the code at the ending label $l_{end}$, and a security context κ. It generates the extended code heap type $\psi'$ and code heap H', and produces the timing annotation for the starting label $l_{start}$.

The definition of the command translation may appear complex, since it provides a formal model of a certifying compiler. Nonetheless, it is not difficult to follow because some invariants are maintained by the translation:

H is well-typed under $\psi$ and contains entries for all source variables and procedures;

$\psi$ and H already contain the continuation code labeled $l_{end}$;

The code at $l_{end}$ has the timing behavior reflected by t;

The new code labeled $l_{start}$ will be put into $\psi'$ and H';

The produced annotation t' will reflect the timing behavior of the code starting at $l_{start}$;

The security context κ must match pc;

Manipulation of the Timing Annotations

Suppose addition + is extended in the expected way to work with ∞. In Rule [TRC1], when computing the timing annotation t' of the starting label, the cost of the assembly instructions for computing the source command is added on top of the timing annotation t of the ending label. In Rule [TRC2], the security level is low, so the special annotation ∞ is used. Rule [TRC3] dictates that, for a conditional, one must take into account the timing of the "longer" branch. Rule [TRC4] essentially introduces some wrapper code, hence its timing computation. For a sequential command, Rule [TRC5] pieces together the translation of the two sub-commands. Finally, for a while-loop, Rule [TRC6] simply uses the special annotation ∞.

For more information on the other translation rules, see D. Yu and N. Islam, "A Typed Assembly Language for Confidentiality," Technical Report DCL-TR-2005-0002, DoCoMo Communications Laboratories USA, San Jose, Calif., March 2005, http://www.docomolabsresearchers-usa.com/-dyu/talc-tr.pdf. The correctness of the translation is formulated as two lemmas, which can be proven straightforwardly by structural induction on the derivation of the translation.

If Φ~Ψ, Φ ⊢ E: t,    Lemma 1 (Expression Translation)

|E| = $\vec{\iota}$||r; t, and Ψ; {r: |t|}; κ; t' ⊢ I, then Ψ; {}; κ; t + t' ⊢ $\vec{\iota}$; I.

If Φ~Ψ, Φ;[pc] ⊢ C,    Lemma 2 (Command Translation)

$$\left|\frac{TD}{\Phi;[pc] \vdash C}\right|$$

$$\begin{bmatrix} \Psi \\ H \\ l_{start}; l_{end}: t; \kappa \end{bmatrix} = \begin{bmatrix} \Psi' \\ H' \\ t' \end{bmatrix},$$

$\Psi(l_{end}) = (\forall [] \cdot ⟨κ, t⟩\{\})_⊥$,

SL(κ) = |pc|,

⊢ H: Ψ, then Φ~Ψ',

⊢ H': Ψ' and Ψ' ⊢

$l_{start}$: $(\forall [] \cdot ⟨κ; t'⟩\{\})_⊥$.

Timing Channels, Possibilistic Noninterference, and Probabilistic Noninterference One embodiment of the present patent is on information-flow security in the presence of termination channels. Below, three other embodiments relating to timing channels, possibilistic noninterference, and probabilistic noninterference are described.

Timing Channels

Considering timing channels, we extend the machine model to explicitly specify execution time t and output actions output n, allowing the observation of more exact timing information of the program execution.

On top of $TAL_C$'s small-step state transition in the form of $P \longmapsto P'$, the action sequences produced along with the program execution are specified in the form of $$P \overset{as}{\longmapsto} P'.$$

This means that P steps to P' producing observable action sequence as, where as represents output numbers n separated by execution times t.

(Action Sequences) $as ::= \epsilon \mid t \; as \mid n \; as$

In the operational semantics, the value of as would be determined by the current instruction. Consider the following sample case:

$$(H, R, mov\, r_d, w; I)_\kappa \overset{t_{movi}}{\longmapsto} (H, R\{r_d \mapsto w\}, I)_\kappa.$$

This is the operational semantics case of executing a mov instruction on an immediate operand ω. Besides the regular machine state update, the above also specifies the time $t_{movi}$ needed for completing this instruction. The straightforward definition of the operational semantics has been omitted to avoid obscuring the present invention, and $t_{comm}$ is used to represent the execution time of instruction comm. It is assumed that a primitive operation (i.e., an assembly instruction) should execute in constant time, regardless of the values given as arguments. Note that this does not prevent mov $r_d$, ω (move immediate) and mov $r_d$, $r_s$ (move register) from being timed differently. The reflexive transitive closure of the step transition is extended accordingly.

This extended machine model exposes information leak through the timing channels. Take the following source-level program as an example.

if h then {time-consuming operation} else skip;
output n

If h≠0, the program produces observable action sequence $t_{long}$ n, where $t_{long}$ is the execution time of the "time-consuming operation." If h=0, the program produces $t_{skip}$ n, where $t_{skip}$ is the execution time of the skip command. This presents information leak, even if no low data is updated in the program.

The approach of $TAL_C^+$ as described earlier can be used to account for such information leak through timing channels. Instead of recording an upper bound of execution steps until the end of a high region, timing annotations are used to record the exact observable action sequence as. Based on the same reasoning for disallowing low updates in a high region, output actions are disallowed in a high region. In essence, the extended timing annotations reflect execution time. In such an extended system, the typing rule for branching should check that the timing annotations of the two branches match.

The exact adaptation to $TAL_C^+$ is given in FIG. 14. By giving the timing judgments different definitions, a type system for closing timing channels is obtained, and the typing rules of FIGS. 10 and 11 remain the same. The timing rules in FIG. 14 reflect the idea that exact timing is tracked. For time passage $$\theta \vdash t \overset{t'}{\longrightarrow} t''$$

in a non-low context, t is made to reflect the sum of t' and t" exactly. ∞ is still only allowed in low contexts. Finally, the matching of timing θ⊢t~t' is defined as t=t'; recall that this is used when type-checking the branching instruction to make sure that the branches exhibit the same timing behavior. An example program and related timing annotations are given in FIG. 15.

The certifying compilation scheme described herein can be adapted to support secure source programs, such as those produced by a cross-copying transformation proposed by J. Agat in "Transforming Out Timing Leaks," Proc. 27th ACM Symposium on Principles of Programming Languages, pages 40-53, Boston, Mass., January 2000. If a program P is accepted by the cross-copying transformation and transformed into P', then the adapted certifying compilation scheme will translate P' into well-typed assembly code.

For the adaptation, the only change would be in Rule [TRC3], where "balanced branches" are ensured to remain balanced after the compilation. One way is provided as Rule [TRC3'] in FIG. 16. Note that in a transformed source program, the two branches of a conditional are balanced. Therefore, Rule [TRC3'] will generate code where $t_1 = t_2$. In the previous Rule [TRC3], the target code is not balanced, and "max" is used to take the upper bound. Now Rule [TRC3'] inserts an extra code block labeled $l_1'$ so that the branches remain balanced in the target code.

Possibilistic Noninterference

In one embodiment, to consider the problem of information flow in a multi-threaded setting, the notion of noninterference is extended to account for the nondeterministic execution of threads. In one embodiment, a straightforward generalization which considers the observable behavior of a program as the set of possible execution results is used.

The interaction between threads can be exploited as a channel of information flow. Even if an attacker cannot observe the external timing behaviors of a program, some internal timing behaviors may still result in illicit information flow, e.g., by affecting the execution order of interacting threads.

FIG. 17 gives an example program of three threads. Suppose the value of f is initially 0. Consider the case where h is true. Thread 1 will be "unlocked" first. Thread 2 will be "unlocked" after the last statement of thread 1. Therefore, the final value of 1 will be true. Similarly, the final value of 1 will be false if h is false. Effectively, the above multi-threaded program copies the content of h into 1. Each of the individual threads is well-typed under a typical sequential information-flow type system (e.g., that of FIG. 1B), assuming that h and f are high variables and 1 is a low variable. Nonetheless, the threads together leak high information.

In one embodiment, to guarantee possibilistic noninterference in the presence of nondeterministic thread scheduling, every thread is checked in this type system separately to satisfy two requirements in addition to those enforced for noninterference in the sequential setting:

1. The guard of a while-loops must have type low;
2. The while-loop itself must also have type low.

These two conditions are the same as those for closing termination channels in source-level programs. Essentially, loops can only happen under low PCs (see Rule [C6'] above). This is convenient, because the techniques for assembly code described above can be reused. In particular, the absence of backward jumps in high regions is enforced with monotonically decreasing timing annotations. The introduction of multi-threading does not affect the treatment described above, because the type checking is performed separately for each thread.

Probabilistic Noninterference

The generalization of noninterference described above considers the set of possible execution results. This is sometimes not strong enough to prevent certain exploits in practice. For example, the probability distribution of the possible results may serve as a channel of information flow.

FIG. 18 illustrates an example program. Suppose h is high, l is low, and $C_{long}$ is a long statement sequence with many potential context switches in the middle. This program would be considered secure with the analysis of possibilistic noninterference described above. However, under most schedulers, the result of l is likely to be the same as h, because the thread that executes the longer branch will likely to finish later than the other thread. Even though the set of possible results of l is the same regardless of the value of h, the probability distributions of the possible results are different.

Such probabilistic attacks exploit the internal timing behaviors of programs. Therefore, in one embodiment, the techniques for closing timing channels is adapted from addressing external timing to addressing internal timing. More specifically, instead of reflecting the external execution time of the program instructions, we the timing annotations reflect the number of potential context switches—the "internal time" observable by threads. This internal time advances by one unit whenever there is a potential context switch. Thus, in one embodiment, the analysis of timing-sensitive noninterference is adapted accordingly, enforcing the following:

1. To disallow low assignments in high regions;
2. To disallow while-loops in high regions;
3. To allow a high conditional only if the two branches have matching internal-timing annotations.

It is natural for $TAL_C^+$ to support the certifying compilation of secure source programs (e.g., Sabelfeld and Sands, "Probabilistic Noninterference for Multi-Thread Programs," Proc. 13th IEEE Computer Security Foundations Workshop, pages 200-214, Cambridge, UK, July 2000), as long as one takes care to implement atomic commands, skip instructions, and dummy forks correctly.

Correctness

The equivalence of two programs with respect to a security level $\theta$ is defined. Intuitively, two programs (heaps and register files) are equivalent if and only if they agree on their low-security contents.

Definition 1 (Heap Equivalence) $\psi \vdash H_1 \approx_\theta H_2 \iff \forall l \in dom(\psi)$, if $\psi(l) = \tau_{\theta'}$ and $\theta' \subseteq \theta$ then $H_1(l) = H_2(l)$.

Definition 2 (Register File Equivalence) $\Gamma \vdash R_1 \approx_\theta R_2 \iff \forall r \in dom(\Gamma)$, if $\Gamma(r) = \tau_{\theta'}$ and $\theta' \subseteq \theta$, then $R_1(r) = R_2(r)$.

Definition 3 (Program Equivalence) $\overline{\psi; \Gamma} \vdash P_1 \approx_\theta P_2 \iff P_1 = (H_1, R_1, I_1)_{\kappa_1}$, $P_2 = (H_2, R_2, I_2)_{\kappa_2}$, $\psi \vdash H_1 \approx_\theta H_2$, $\Gamma \vdash R_1 \approx_\theta R_2$, and either:

$$\kappa_1 = \kappa_2, SL(\kappa_1) \subseteq \theta, \text{ and } I_1 = I_2, \text{ or} \quad (1)$$

$$SL(\kappa_1) \not\subseteq \theta, SL(\kappa_2) \not\subseteq \theta. \quad (2)$$

The above relations are all reflexive, symmetrical, and transitive. The noninterference theorem relates the executions of two equivalent programs that both start in a low security context (relative to the security level of concern). In $TAL_C$, if both executions terminate, then the result programs are equivalent. The extra timing annotations now guarantee that nontermination can only happen in a context at the lowest security level.

The idea of the proof is intuitive. Given a security level of concern, the executions are phased into "low steps" and "high steps." It is easy to relate the two executions under a low step, because they involve the same instructions. Under a high step, the two executions are no longer in lock step. Recall that raise and lower mark the beginning and end of a secured region. The program states before the raise and after the lower are related, circumventing directly relating two executions under high steps. In addition, there would be no nontermination in the secured region.

Formal details are provided in three lemmas and a noninterference theorem. Lemma 3 indicates that a security context in a high step can be changed only with raise or lower. Lemma 4 says that a program in a high context will eventually reduce to a step that discharges the current security context with a lower. Lemma 5 articulates the lock step relation between two equivalent programs in a low step. Theorem 1 of noninterference then follows: given two equivalent programs, if one terminates, then the other terminates in a state equivalent to the first. As a corollary, if one does not terminate, then the other does not either.

In the following, $\longmapsto^*$ represents the reflexive and transitive closure of a single-step relation $\longmapsto$ of the operational semantics. $\Gamma \succeq_\theta \Gamma'$ means that $\Gamma(r) = \Gamma'(r)$ for every r such that $\Gamma(r) = \tau_{\theta'}$ and $\theta' \subseteq \theta$. The symbol Q is used in addition to P to denote programs when comparing two executions.

Lemma 3 (High Step) If $P = (H, R, I)_\kappa$, $SL(\kappa) \not\subseteq \theta$, $\psi; \Gamma; t \vdash P$, then either:

1. there exists $\Gamma_1$, $t_1$ and $P_1 = (H_1, R_1, I_1)_\kappa$ such that $P \longmapsto P_1$, $\psi; \Gamma_1; t_1 \vdash P_1$, $\Gamma \succeq_\theta \Gamma_1$, $t_1 < t$, and $\psi; \Gamma_1 \vdash P \approx_\theta P_1$, or
2. I is of the form (raise $\kappa'$; I') or (lower $\omega$).

Proof sketch: By case analysis on the first instruction of I. I cannot be halt, because the typing rule for halt requires the context to be •. If I is not halt, raise or lower, by the operational semantics and inversion on the typing rules, one can get $\Gamma_1$, $t_1$ and $P_1$ for the next step. $t_1 < t$ holds due to the time passage judgment in the typing rules. The typing rules also prohibit writing into a low heap cell, hence low heap cells remain the same after the step. When a register is updated, $\Gamma_1$ gives it a type whose security label takes $SL(\kappa)$ into account, hence that register has a high type in $\Gamma_1$. As a result, $\Gamma \succeq_\theta \Gamma_1$ and $\psi; \Gamma_1 \vdash P \approx_\theta P_1$. □

Lemma 4 (Context Discharge) If $P = (H, R, I)_{\theta \triangleright w}, \theta \subset \theta'$, $\psi; \Gamma$; $t \vdash P$, then there exists $\Gamma'$, $t'$ and $P' = (H', R', \text{lower } w)_{\theta \triangleright w}$ such that $P \longmapsto^* P'$, $\psi; \Gamma'; t' \vdash P'$, $\Gamma \succeq_\theta \Gamma'$, $t' \leq t$, and $\psi; \Gamma' \vdash P \approx_\theta P'$.

Proof sketch: By generalized induction on t.

The base case of t=0 is easily discharged, because by inversion on the well-typedness of P with $\theta \neq \bot$, a time-passage judgment can be obtained which implies that t>0.

In the inductive case, suppose the proposition holds for any $t < t_0$. There are two cases to consider, following Lemma 3.

In the case where the first instruction of I is not raise or lower, by Lemma 3, there exists $\Gamma_1$, $t_1$ and $P_1$ such that $P \longmapsto P_1$, $\psi; \Gamma_1; t_1 \vdash P_1$, $\Gamma \succeq_\theta \Gamma_1$, $t_1 < t$, $\psi; \Gamma_1 \vdash P \approx_\theta P_1$, and the security context of $P_1$ is the same as that of P. By induction hypothesis on $t_1$ and $P_1$, there exists $\Gamma'$, $t'$, and $P'$ such that $P_1 \longmapsto^* P'$, $\psi; \Gamma'$; $t' \vdash P'$, $\Gamma_1 \succeq_\theta \Gamma'$, $t' \leq t_1$ and $\psi; \Gamma' \vdash P_1 \approx_\theta P'$. Putting the above together, $P \longmapsto^* P'$, $\Gamma \succeq_\theta \Gamma'$ because $\succeq_\theta$ is transitive by definition, $t' \leq t$, and $\psi; \Gamma' \vdash P \approx_\theta P'$ by definition and the fact that $\Gamma_1 \succeq_\theta \Gamma'$.

Case I=raise $\theta_1 \triangleright \omega_1$; $I_1$. By definition of the operational semantics, $P \longmapsto P_1$ where $P_1 = (H, R, I_1)_{\theta_1 \triangleright \omega_1}$. By inversion on $\psi; \Gamma$; $t \vdash P$ and the typing rule of raise, $\theta \subset \theta_1$ and there exists $t_1 < t$ such that $\psi; \Gamma; \theta_1 \triangleright \omega_1; t_1 \vdash I_1$. By definition of well-typed programs, $\psi; \Gamma; t_1 \vdash P_1$. By induction hypothesis on $t_1$ and $P_1$, there exists $\Gamma_2$, $t_2$, and $P_2 = (H_2, R_2, \text{lower } w_1)_{\theta_1 \triangleright w_1}$ such that $P_1 \longmapsto^* P_2$, $\psi; \Gamma_2$; $t_2 \vdash P_2$, $\Gamma \succeq_\theta \Gamma_2$, $t_2 \leq t_1$, and $\psi; \Gamma_2 \vdash P_1 \approx_\theta P_2$. $\psi; \Gamma_2 \vdash P \approx_\theta P_2$ then follows because the heaps and register files in P and $P_1$ are the same.

Suppose $H(\omega_1) = \text{code}[\ ]\langle \kappa; t_3 \rangle \Gamma_3.I_3$. By inversion on the typing rule of lower (the current instruction of $P_2$), $t_3 < t_2$. By the operational semantics, $P_2 \mapsto P_3$ where $P_3=(H_2, R_2, I_3)_\kappa$. By inversion on the well-typedness of I (i.e., raise $\theta_1 \triangleright \omega_1; I_1$), $\kappa = \theta \triangleright \omega$. By induction hypothesis on $t_3$ and $P_3$, there exists $\Gamma'$, $t'$, and $P' = (H', R', \text{lower } w)_{\theta \triangleright w}$ such that $P_3 \mapsto^* P'$, $\psi; \Gamma'$; $t' \vdash P'$, $\Gamma_2 \succeq_\theta \Gamma'$, $t' \leq t_3$, and $\psi; \Gamma' \vdash P_3 \approx_\theta P'$. Putting the above together, the original proposition holds for case I=raise $\theta_1 \triangleright \omega_1; I_1$.

Case I=lower $\omega_1$. By inversion on the typing rule of lower, $\omega = \omega_1$. Choosing $\Gamma' = \Gamma$, $t' = t$ and $P' = P$, the proposition holds trivially. □

Lemma 5 (Low Step) If $P=(H, R, I)_\kappa$, $SL(\kappa) \subseteq \theta$, $\psi; \Gamma; t \vdash P, \psi$; $\Gamma; t \vdash Q, \psi; \Gamma \vdash P \approx_\theta Q$, $P \mapsto P_1$, $Q \mapsto Q_1$, then exists $\Gamma_1$ and $t_1$ such that $\psi; \Gamma_1; t_1 \vdash P_1, \psi; \Gamma_1; t_1 \vdash Q_1$ and $\psi; \Gamma_1 \vdash P_1 \approx_\theta Q_1$.

Proof sketch: By case analysis on the first instruction of I. By $SL(\kappa) \subseteq \theta$ and the definition of $\approx_\theta$, P and Q contain the same instruction sequence. The case of raise does not change the state, hence trivially maintains the equivalence. All other cases maintain that the security context is lower than $\theta$. Inspection on the typing rules shows that low locations in the heap can only be assigned low values. Once a register is given a high value, its type in $P_1$ will change to high. In the case of branching, the guard must be low, so both P and Q branch to the same code. Hence the two programs remain equivalent after one step. □

Theorem 1 (Noninterference) If $P=(H, R, I)_\kappa$, $SL(\kappa) \subseteq \theta$, $\psi; \Gamma$; $t \vdash P, \psi; \Gamma; t \vdash Q, \psi; \Gamma \vdash P \approx_\theta Q$, and $P \mapsto^* (H_p, R_p, \overline{\text{halt}} [\sigma_p])_.$, then exists $H_q, R_q, \sigma_q$ and $\Gamma'$ such that $Q \mapsto^* (H_q, R_q, \text{halt} [\sigma_q])_.$, and $\psi; \Gamma' \vdash (H_p, R_p, \text{halt}[\sigma_p]) \approx_\theta (H_q, R_q, \text{halt}[\sigma_q])_.$ Proof sketch: By generalized induction on the number of steps of the derivation $P \mapsto^* (H_p, R_p, \text{halt}[\sigma_p])_.$. The base case of zero step is trivial. The inductive case is proven by case analysis on the first instruction of I.

Consider the case where I=raise $\theta_1 \triangleright \omega_1$; $I_1$ and $\theta_1 \subseteq \theta$. By definition of the operational semantics and the typing rules, there exist $t_1$ such that $P \mapsto P_1$ where $P_1 = (H, R, I_1)_{\theta_1 \triangleright w_1}, t_1 \leq t$, and $\psi; \Gamma; t_1 \vdash P_1$. By Lemma 4, there exists $\Gamma_2$, $t_2$ and $P_2 = (H_2, R_2, \text{lower } w_1)_{\theta_1 \triangleright w_1}$ such that $P_1 \mapsto^* P_2, \psi; \Gamma_2; t_2 \vdash P_2, \Gamma \succeq \Gamma_2, t_2 \leq t_1$ and $\psi; \Gamma_2 \vdash P_1 \approx_\theta P_2$. Hence $\psi \vdash H \approx_\theta H_2$ and $\Gamma_2 \vdash R \approx_\theta R_2$.

By case lower of the operational semantics, $P_2 \mapsto P_3$ where $P_3=(H_2, R_2, I^3)_{\kappa_3}$ and $H(\omega_1) = \text{code}[ ] \{\kappa_3; t_3\} \Gamma_3.I_3$. By inversion on the derivation of $\psi; \Gamma_2; t_2 \vdash P_2$, we get $\Gamma_3 \subseteq \Gamma_2, t_3+1 \leq t_2$, and $\psi; \Gamma_3; t_3 \vdash P_3$. It follows that $\Gamma_3 \vdash R \approx_\theta R_2$. By inversion on the derivation of $\psi; \Gamma$; $t \vdash P$ where the instruction sequence of P is raise $\theta_1 \triangleright \omega_1; I_1$, we get $\kappa_3 = \kappa$.

By similarly reasoning, $Q \mapsto^* Q_3$ where $Q_3=(H_2', R_2', I_3)_{\kappa_3}, \psi \vdash H \approx_\theta H_2', \Gamma_3 \vdash R \approx_\theta R_2'$ and $\psi; \Gamma_3; t_3 \vdash Q_3$. By transitivity of the equivalence relations, $\psi \vdash H_2 \approx_\theta H_2'$ and $\Gamma_3 \vdash R_2 \approx_\theta R_2'$. Hence $\psi; \Gamma \vdash P_3 \approx_\theta Q_3$. The case then follows by induction hypothesis.

All other cases remain low after a step. By Lemma 5, the two programs in the next step are equivalent and well-typed. The proof of these cases then follows by induction hypothesis. □

An Example of a Computer System

Figure 19:
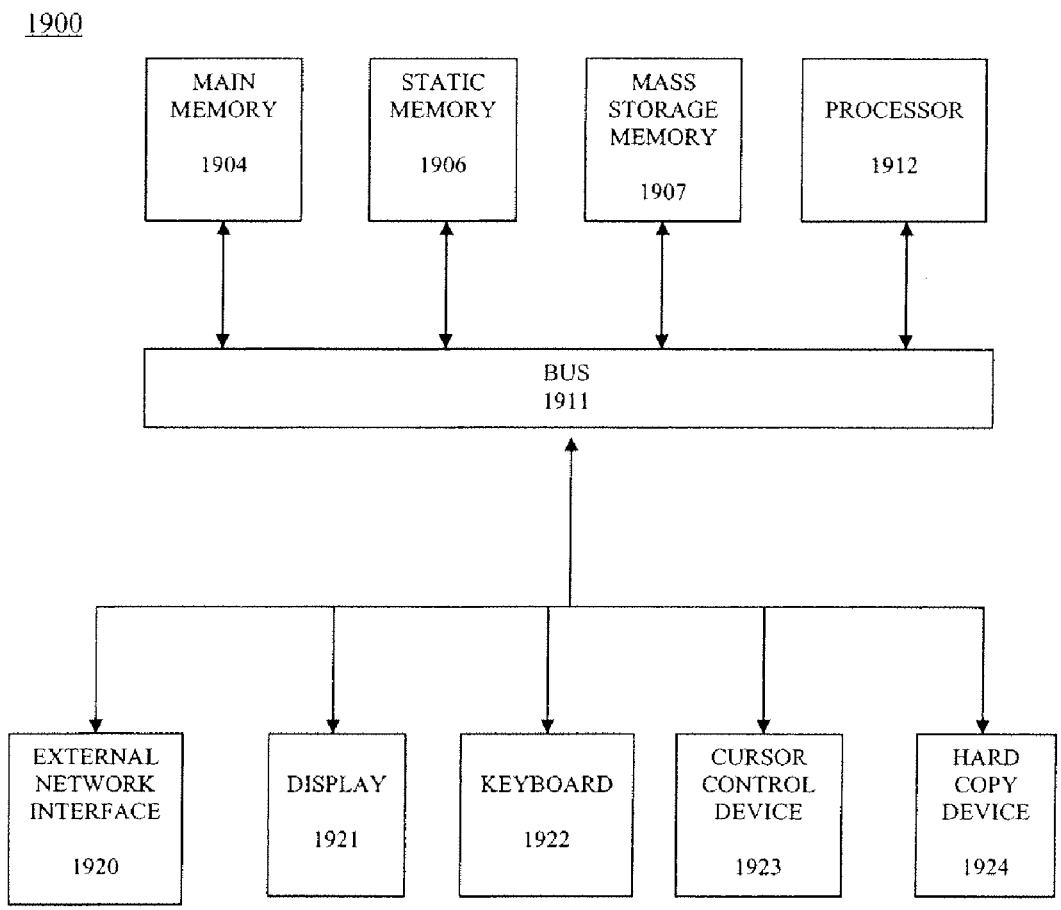
FIG. 19 is a block diagram of one embodiment of a computer system.

FIG. 19 is a block diagram of an exemplary computer system that may perform one or more of the operations described herein. Referring to FIG. 19, computer system 1900 may comprise an exemplary client or server computer system. Computer system 1900 comprises a communication mechanism or bus 1911 for communicating information, and a processor 1912 coupled with bus 1911 for processing information. Processor 1912 includes a microprocessor, but is not limited to a microprocessor, such as, for example, Pentium™, PowerPC™, Alpha™, etc.

System 1900 further comprises a random access memory (RAM), or other dynamic storage device 1904 (referred to as main memory) coupled to bus 1911 for storing information and instructions to be executed by processor 1912. Main memory 1904 also may be used for storing temporary variables or other intermediate information during execution of instructions by processor 1912.

Computer system 1900 also comprises a read only memory (ROM) and/or other static storage device 1906 coupled to bus 1911 for storing static information and instructions for processor 1912, and a data storage device 1907, such as a magnetic disk or optical disk and its corresponding disk drive. Data storage device 1907 is coupled to bus 1911 for storing information and instructions.

Computer system 1900 may further be coupled to a display device 1921, such as a cathode ray tube (CRT) or liquid crystal display (LCD), coupled to bus 1911 for displaying information to a computer user. An alphanumeric input device 1922, including alphanumeric and other keys, may also be coupled to bus 1911 for communicating information and command selections to processor 1912. An additional user input device is cursor control 1923, such as a mouse, trackball, trackpad, stylus, or cursor direction keys, coupled to bus 1911 for communicating direction information and command selections to processor 1912, and for controlling cursor movement on display 1921.

Another device that may be coupled to bus 1911 is hard copy device 1924, which may be used for marking information on a medium such as paper, film, or similar types of media. Another device that may be coupled to bus 1911 is a wired/wireless communication capability 1925 to communication to a phone or handheld palm device.

Note that any or all of the components of system 1900 and associated hardware may be used in the present invention. However it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A computer-implemented method comprising:
   receiving, by a processor of the computer, assembly code having type information and timing annotations that provide explicit information on security levels of the annotated assembly code and ending points of the security levels, wherein the timing annotations enforce information flow for the assembly code with respect to one or more of timing-related covert and concurrent channels when statically checked as to whether the assembly code is in violation of a security policy; and
   performing, by the processor, verification with respect to the information flow for the assembly code based on the security policy;
   wherein the information flow for the assembly code comprises the flow of data resulting when the assembly code is executed, the data having different security levels.

2. The method defined in claim 1 wherein concurrent channels are associated with multi-threading.

3. The method defined in claim 1 wherein the timing-related covert channels comprise one or more of termination channels, timing channels, possibilistic channels, and probabilistic channels.

4. The method defined in claim 1 wherein the timing annotations express source-level constraints.

5. The method defined in claim 1 wherein the timing annotations include one or more of a group consisting of a first annotation that specifies a time value indicative of an amount of time a command requires to execute, a second annotation that specifies that timing associated with a command may change after a specified period of time, a third annotation that specifies an acceptable timing for a command to execute under a specified security level, and a fourth annotation that specifies that the timing associated with a command matches a passage of time under a specified security level.

6. The method defined in claim 1 wherein the timing annotations are indicative of execution time associated with an observable action sequence to enable observation of timing information associated with execution of a portion of the assembly code.

7. The method defined in claim 1 wherein the timing annotations enable checking to ensure that no outputs or updates to variables of a first security level occur in a region of the code having a second security level that is higher than the first security level.

8. The method defined in claim 1 further comprising: removing the annotations from the code; and running the code if performing verification determines the code does not violate the security policy.

9. The method defined in claim 1 wherein performing verification occurs on a device prior to the device running the code.

10. The method defined in claim 1 further comprising running the code if performing verification determines the code does not violate the security policy.

11. The method defined in claim 1 wherein receiving the code comprises downloading the code.

12. The method defined in claim 1 wherein receiving securely typed native code comprises receiving assembly code that has undergone a security-type preserving translation that includes annotating the assembly code with type information, and further wherein performing verification comprises verifying the type information by statically checking, with respect to a safety policy, information flow that would occur under control of the assembly code when executed.

13. The method defined in claim 1 wherein the timing annotations enable checking to indicate that both branches of a branching instruction exhibit the same timing behavior.

14. The method defined in claim 13 wherein both branches of the branching instruction exhibit the same timing behavior when the branches meet in a same amount of time at the end of the code identified at a particular security level.

15. The method defined in claim 1 wherein performing verification comprises statically checking behavior of the code to determine whether the code does not violate the security policy.

16. The method defined in claim 15 wherein the code does not violate the security policy if the code, when executed, would not cause information of an identified type to flow from a device executing the code.

17. An article of manufacture having one or more non-transitory recordable media storing instructions thereon which, when executed by a system, causes the system to perform a method comprising:
receiving assembly code having type information and timing annotations that provide explicit information on security levels of the annotated assembly code and ending points of the security levels, wherein the timing annotations enforce information flow of the assembly code with respect to one or more of timing-related covert and concurrent channels when statically checked as to whether the assembly code is in violation of a security policy; and
performing verification with respect to the information flow for the assembly code based on the security policy;
wherein the information flow for the assembly code comprises the flow of data resulting when the assembly code is executed, the data having different security levels.

18. The article of manufacture defined in claim 17 wherein the timing annotations express source-level constraints.

19. The article of manufacture defined in claim 17 wherein the timing annotations include one or more of a group consisting of a first annotation that specifies a time value indicative of an amount of time a command requires to execute, a second annotation that specifies that timing associated with a command may change after a specified period of time, a third annotation that specifies an acceptable timing for a command to execute under a specified security level, and a fourth annotation that specifies that the timing associated with a command matches a passage of time under a specified security level.

20. The article of manufacture defined in claim 17 wherein the timing annotations are indicative of execution time associated with an observable action sequence to enable observation of timing information associated with execution of a portion of the assembly code.

21. The article of manufacture defined in claim 17 wherein the timing annotations enable checking to ensure that no outputs or updates to variables of a first security level occur in a region of the code having a second security level that is higher than the first security level.

22. The article of manufacture defined in claim 17 wherein the timing annotations enable checking to indicate that both branches of a branching instruction exhibit the same timing behavior.

23. The article of manufacture defined in claim 22 wherein both branches of the branching instruction exhibit the same timing behavior when the branches meet in a same amount of time at the end of the code identified at a particular security level.

24. An apparatus comprising:
a memory to store annotated assembly code, a verification module, and a code modification module, wherein the annotated assembly code having timing annotations with type information providing explicit information on security levels of the annotated assembly code and ending points of the security levels, wherein the timing annotations enforce information flow for the assembly code with respect to one or more of timing-related covert and concurrent channels when statically checked as to whether the assembly code is in violation of a security policy; and
a processor to execute the verification module to perform verification with respect to the information flow for the annotated assembly code based on the security policy;
wherein the information flow for the assembly code comprises the flow of data resulting when the assembly code is executed, the data having different security levels.

25. The apparatus defined in claim 24 wherein the timing annotations include one or more of a group consisting of a first annotation that specifies a time value indicative of an amount of time a command requires to execute, a second annotation that specifies that timing associated with a command may change after a specified period of time, a third annotation that specifies an acceptable timing for a command to execute under a specified security level, and a fourth annotation that specifies that the timing associated with a command matches a passage of time under a specified security level.

26. The apparatus defined in claim 24 wherein the timing annotations are indicative of execution time associated with an observable action sequence to enable observation of timing information associated with execution of a portion of the assembly code.

27. The apparatus defined in claim 24 wherein the timing annotations enable checking to ensure that no outputs or updates to variables of a first security level occur in a region of the code having a second security level that is higher than the first security level.

28. The apparatus defined in claim 24 wherein the processor performs verification by statically checking behavior of the code to determine whether the code does not violate the security policy by causing information of an identified type to flow from a device executing the code.

29. The apparatus defined in claim 24 further comprising wireless communication hardware and software to send and receive wireless communications.

30. The apparatus defined in claim 24 wherein the timing annotations enable checking to indicate that both branches of a branching instruction exhibit the same timing behavior.

31. The apparatus defined in claim 30 wherein both branches of the branching instruction exhibit the same timing behavior when the branches meet in a same amount of time at the end of the code identified at a particular security level.

32. A computer-implemented method comprising:
performing, by a processor of the computer, a security-type preserving translation on assembly code, including annotating the code with timing annotations with type information providing explicit information on security levels of the annotated assembly code and ending points of the security levels, wherein the timing annotations enforce information flow for the assembly code with respect to one or more of timing-related covert and concurrent channels when statically checked as to whether the code is in violation of a security policy;
certifying, by the processor, compilation for the information flow resulting from the assembly code when executed; and
enabling, by the processor, the securely typed assembly code to be downloaded over a network;
wherein the information flow for the assembly code comprises the flow of data resulting when the assembly code is executed, the data having different security levels.

* * * * *